/ Patented Jan. 4, 1972

3,632,758
INSECTICIDAL OXIMES
Richard D. Partos and Walter A. Darlington, Brentwood, Mo., assignors to Monsanto Company, St. Louis, Mo.
No Drawing. Filed Mar. 11, 1970, Ser. No. 18,748
Int. Cl. A01n 9/36, 17/10; C07c 131/08
U.S. Cl. 424—211     15 Claims

ABSTRACT OF THE DISCLOSURE

Insecticidal oximes of the formula

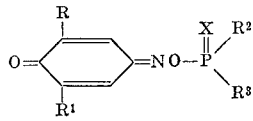

in which X is oxygen or sulfur, R, $R^1$, $R^2$ and $R^3$ are alkyl or alkoxy having from 1 to 5 carbon atoms and are like or unlike.

---

This invention relates to new and useful oximes, and to insecticidal compositions containing at least one of these oximes as an active ingredient. The compounds of this invention can be represented by the formula

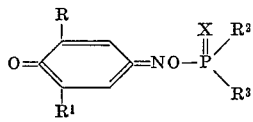

in which X is oxygen or sulfur, R, $R^1$, $R^2$ and $R^3$ are alkyl or alkoxy having from 1 to 5 carbon atoms and are like or unlike. The substituents in the above formula can be methyl, ethyl, n-propyl, isopropyl, n-butyl, secondary butyl, tertiary butyl, n-pentyl, isopentyl, or tertiary pentyl and the corresponding alkoxy groups.

The compounds of this invention can be prepared in accordance with the following general equation in which the substituents have the aforedescribed significance.

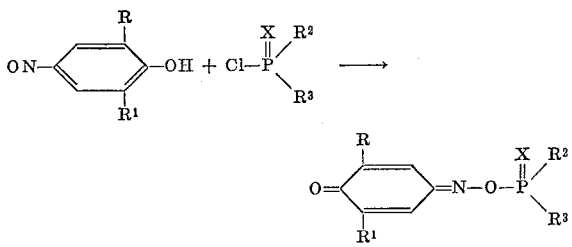

These reactions are conveniently executed at a temperature between about 20° C. and 50° C. in the presence of an inert solvent such as benzene, toluene, xylene and the like.

As illustrative of the preparation of the compounds of this invention is the following:

To a suitable reaction vessel equipped with a thermometer and an agitator is charged about 7.3 grams of the chloride of dimethylphosphoric acid in 50 cc. of benzene, and a mixture of about 11.8 grams of 2,6-di-t-butyl-4-nitrosophenol and about 5.1 grams of triethylamine in 50 cc. of benzene is added thereto. The reaction mixture is stirred for about 15 minutes at room temperature, and then stirred for an additional 30 minutes while the temperature is permitted to rise to about 40° C. The reaction mixture is cooled, filtered, and washed in a saturated sodium chloride solution. The precipitate is dried and evaporated to obtain an oily solid which is refluxed with hexane. The 2,6-di-t-butyl-p-benzoquinone imine O-(dimethoxyphosphonyl) oxime thus obtained has a melting point of 100–101° C.

Analysis.—Theory (percent): C, 55.96; H, 7.63; N, 4.08; P, 9.02. Found (percent): C, 56.15; H, 7.82; N, 4.08; P, 9.10.

The nitrosophenol used as a reactant in the above preparation can be readily obtained by nitrosating 2,6-di-t-butyl-phenol with sodium nitrite in an aqueous alcoholic medium. In like manner, other alkyl nitrosophenols can be prepared by the reaction of a phenol having appropriate alkyl substituents in the 2 and 6 positions.

Other compounds of this invention that are prepared by the above general procedures include:

2,6-dimethyl-p-benzoquinone imine O-(dimethoxyphosphonyl) oxime
2,6-diethyl-p-benzoquinone imine O-(diethoxyphosphonyl) oxime
2,6-diethyl-p-benzoquinone imine O-(diisopropoxyphosphonyl) oxime
2,6-di-n-propyl-p-benzoquinone imine O-(di-n-propoxyphosphonyl) oxime
2,6-di-n-butyl-p-benzoquinone imine O-(di-n-butoxyphosphonyl) oxime
2,6-di-sec-butyl-p-benzoquinone imine O-(di-sec-butoxyphosphonyl) oxime
2,6-di-n-pentyl-p-benzoquinone imine O-(di-n-pentoxyphosponyl) oxime
2,6-diisopentyl-p-benzoquinone imine O-(diisopentoxyphosphonyl) oxime
2,6-di-tert-pentyl-p-benzoquinone imine O-(di-tert-pentoxyphosphonyl) oxime
2,6-di-tert-butyl-p-benzoquinone imine O-(diethoxyphosphonyl) oxime
2-methyl-6-tert-butyl-p-benzoquinone imine O-(dimethoxyphosphonyl) oxime
2,6-di-t-butyl-p-benzoquinone imine O-(ethylmethoxyphosphonyl) oxime The terms "insect" and "insecticide" are used herein in their broad common usage to include spiders, mites, ticks, and like pests which are not in the strict biological sense classed as insects. Thus, the usage herein conforms to the definitions provided by Congress in Public Law 104, the "Federal Insecticide, Fungicide, and Rodenticide Act" of 1947, section 2, subsection h, wherein the term "insect" is used to refer not only to those small invertebrate animals belonging mostly to the class Insecta, comprising six-legged, usually winged forms, as beetles, bugs, bees, flies, and so forth, but also to other allied classes of arthropods whose members are wingless and usually have more than six legs, as spiders, mites, ticks, centipedes, and wood lice.

The value of the novel oximes of this invention as insecticides is enhanced by their exceedingly low mammalian toxicity. For example, 2,6-di-t-butyl-p-benzoquinone imine O-(dimethoxyphosphonyl) oxime has an oral $LD_{50}$ to rats of 143 mg. per kg. of body weight. By contrast, methyl parathion has an oral $LD_{50}$ to rats of about 25 mg. per kg.

As illustrative of the adult housefly activity of the compounds of this invention is the following:

Fifty adult houseflies (Musca domestica) were placed in a cylindrical stainless steel cage 5 inches in diameter and 2 inches high and faced on top and bottom with 14 mesh screen. The cage was positioned at the bottom of a stainless steel spray tower 8 inches in diameter and about 44 inches below an atomizer at the top of the tower. An 0.01% solution of 2,6-di-t-butyl-p-benzoquinone imine O-(dimethoxyphosphonyl) oxime in acetone was discharged through the atomizer under a pressure of 10 pounds per square inch and at a rate of about 28 ml. per minute for about 10 seconds and permitted to come into contact with the caged houseflies. The flies were retained in the cage for 24 hours at room temperature and a count was then made to determine living and dead flies. At this concentration, a 100% kill was observed. When this test was repeated at a concentration of 0.005%, an 88% kill was observed.

In a standard topical test against houseflies, in which a solution of the same insecticide is applied directly to the body of the insect, a 100% kill was observed when only as little as 0.2 microgram per insect was used. In like manner, a 100% kill was obtained with 0.5 microgram of 2,6 - di - t - butyl-p-benzoquinone imine O-(ethylmethoxyphosphonyl) oxime per insect.

The activity of a compound of this invention for the control of cattle ticks is illustrated below.

2,6-di-t-butyl-p-benzoquinone imine O-(dimethoxyphosphonyl) oxime was suspended or dissolved in a trichloroethylene-olive oil mixture and impregnated in chromatographic paper. The trichloroethylene is permitted to evaporate, leaving only olive oil and the oxime on the paper. The unfed larval cattle ticks (*Boophilus microplus*) were exposed to the compound by self-dosing by contact with the treated surfaces.

The oxime was added to the mixture to provide a solution or suspension in which the concentration of the oxime in the olive oil was 1.12% (i.e., 1.12 grams of compound in 100 ml. of olive oil). Portions of this stock solution were then diluted to provide solutions of 0.14 and 0.07 percents respectively.

The chromatographic paper was cut into rectangles of 9 cm. by 7.5 cm. The rectangular papers were then each supported horizontally by four pins and a 0.67 ml. portion of the oxime solution was run on to each of the papers. The papers were then dried, evaporating the trichloroethylene, thus leaving the olive oil with the active ingredient impregnated in the paper. Each of the papers were then formed into a packet by folding the shorter sides together and sealing each of them with a clip. This left one end open. One hundred larvae were introduced into each packet and the opening closed with a clip. After 48 hours at room temperature, the packets were opened and the number of larvae alive and dead were counted. A 97% kill was obtained at a concentration of 0.14% and an 81% kill at 0.07%.

Although the compounds of this invention are useful per se in controlling a wide variety of insect pests, it is preferable that they be supplied to the pests or to the environment of the pests in a dispersed form in a suitable extending agent.

The term "dispersed" is used herein in its widest possible sense. When it is said that the oximes of this invention are dispersed, it means that particles of the oximes may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the compounds of this invention in a carrier such as dichloro-difluoromethane and the like fluorochloroalkanes which boil below room temperature at atmospheric pressure.

The expression "extending agent" as used herein includes insecticidal adjuvants and any and all of the substances in which the compounds of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the compounds of this invention employed in combatting or controlling insect pests can vary considerably provided the required dosage (i.e., toxic or lethal amount) thereof is supplied to the pests or to the environment of the pests. When the extending agent is a liquid or mixture of liquids (e.g., as in solutions, suspensions, emulsions, or aerosols) the concentration of the active compound employed to supply the desired dosage generally will be in the range of 0.0001 to 50 percent by weight. When the extending agent is a semi-solid or solid, the concentration of the oxime employed to supply the desired dosage generally will be in the range of 0.1 to 80 percent by weight. From a practical point of view, the manufacturer must supply the user with a concentrate in such form that, by merely mixing with water or solid extender (e.g. powdered clay or talc) or other low-cost material available to the user at the point of use, he will have an easily prepared insecticidal spray or particulate solid. In such a concentrate composition, the oxime generally will be present in a concentration of 5 to 95 percent by weight, the residue being any one or more of the well-known insecticidal adjuvants, such as the various surface active agents (e.g. detergents, a soap or other emulsifying or wetting agent), surface-active clays, solvents, diluents, carrier media, adhesives, spreading agents, humectants, and the like.

The oximes of this invention are preferably supplied to the insect pests or to the environment of the insect pests in the form of emulsions or suspensions. Emulsions or suspensions are prepared by dispersing the oximes either per se or in the form of an organic solution thereof in water with the aid of a water-soluble surfactant. The term "surfactant" as employed herein is used as in volume II of Schwartz, Perry and Berch's "Surface Active Agents and Detergents" (1958, Interscience Publishers Inc., New York) in place of the expression "emulsifying agent" to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," Second edition, page 280). These surfactants include the well-known capillary-active substances which may be anionic, cationic, or non-ionic which are described in detail in volumes I and II of Schwartz, Perry and Berch's "Surface Active Agents and Detergents" (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants are incorporated in this specification by reference in order to avoid unnecessary enlargement of this specification. The preferred surfactants are the water-soluble anionic non-ionic surface-active agents set forth in U.S. 2,846,398 (issued Aug. 5, 1958). In general, a mixture of water-soluble anionic and water-soluble non-ionic surfactants is preferred.

The compounds of this invention can be dispersed by suitable methods (e.g. tumbling or grinding) in solid extending agents either of organic or inorganic nature and supplied to the insect pests' environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials as well as organic materials such as powdered cork, powdered wood, and powdered walnut shells. The preferred solid carriers are the adsorbent clays, e.g. bentonite. These mixtures can be used for insecticidal purposes in the dry form, or by addition of water-soluble surfactants or wetting agents the dry particulate solids can be rendered wettable by water so as to obtain stable aqueous dispersions or suspensions suitable for use as sprays.

For special purposes the oximes of this invention can be dispersed in a semi-solid extending agent such as petroleum or soap (e.g. sodium stearate or oleate or palmitate or mixtures thereof) with or without the aid of solubility promoters and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of a compound of this invention with a water-soluble surfactant in the weight proportions of 0.1 to 15 parts of surfactant with sufficient phosphonate to make 100 parts by weight. Such a concentrate is particularly adapted to be made into a spray for combatting various forms of insect pests by the addition of water thereto.

Another useful concentrate adapted to be made into a spray for combatting a variety of insect pests is a solution (preferably as concentrated as possible) of a compound of this invention in an organic solvent therefor. The said liquid concentrate preferably contains dissolved therein a minor amount (e.g. 0.5 to 10 percent by weight of the weight of the new insecticidal agent) of a water-soluble surfactant (or emulsifying agent). As illustrative of such a concentrate is a solution of 2,6-dialkyl-p-benzoquinone imine O-(dialkoxyphosphonyl) oxime in xylene which solution contains dissolved therein a water-soluble polyoxyethylene glycol non-ionic surfactant and a water-soluble alkylaryl sulfonate anionic surfactant.

Emulsifiable concentrates of this general type are particularly well adapted for use as sheep and cattle dips in the control of animal parasites. In preparing such dips, an oxime of this invention is dissolved in a water-immiscible solvent system and a sufficient quantity of one or more emulsifying agents is added to insure the formation of a stable aqueous emulsion. Water is then added to the concentrate to form an emulsion containing from about 0.01% to about 0.5% of the active ingredient.

Of the surfacants aforementioned in preparing the various emulsifiable, wettable or dispersible compositions or concentrates of this invention, the anionic and non-ionic surfactants are preferred. Of the anionic surfactants, the particularly preferred are the well known water-soluble alkali metal alkylaryl sulfonates as exemplified by sodium decylbenzene sulfonate and sodium dodecylbenzene sulfonate. Of the non-ionic surfactants, the particularly preferred as the water-soluble polyoxyethylene derivatives of alkylphenols (particularly isooctylphenol) and the water-soluble polyoxyethylene derivatives of the mono-higher fatty acid esters of hexitol anhydrides (e.g. sorbitan). These materials in general contain 15 to 30 moles of ethylene oxide per mole of the hexitol anhydride or the alkylphenol.

The compositions of this invention can also contain other additaments such as fertilizers and pesticides used as, or in combination with, the carrier materials. For example, insecticides useful in combination with the above described compounds include parathion, methyl parathion, pyrethrin, nicotine, aldrin, chlordane, heptachlor, toxaphene, malathion, 2-isopropoxyphenyl N-methylcarbamate, O,O,O,O - tetramethyl O,O′ - thiodi - p-phenylene phosphorothioate, dimethyl phosphate of 3-hydroxy-N-methyl-cis-crotonamide, fenthion, carbofuran, mirex, DDT, dicofol, methoxychlor, dichlorvos, demeton, dimethoate, carbophenothion, ronnel, carbaryl, azinphosmethyl, methonyl, aldicarb and the like.

In controlling or combatting insect pests the oximes of this inveention either per se or compositions containing them are supplied to the insect pests or to their environment in a lethal or toxic amount. This can be done by dispersing the new insecticidal agent or insecticidal composition comprising same in, on or over an infected environment or in, on or over an environment the insect pests frequent, e.g. agricultural soil or other growth media or other media infested with insect pests or attractable to the pests for habitational or sustenance or propagational purposes, in any conventional fashion which permits contact between the insect pests and the oximes of this invention. Such dispersing can be brought about by applying sprays, dips or particulate solid compositions to a surface infested with the insect pests or attractable to the pests as for example, animals such as sheep and cattle, the surface of an agricultural soil or other media such as the above ground surface of plants by any of the conventional methods, e.g. power dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish subsurface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. A compound of the formula

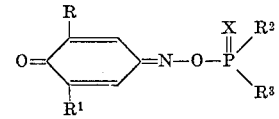

in which X is sulfur or oxygen and R, R¹, R² and R³ are alkyl or alkoxy having from 1 to 5 carbon atoms.

2. A compound in accordane with claim 1 in which R and R¹ are tertiary alkyl.

3. A compound in accordance with claim 1 in which R and R¹ are tertiary butyl and R² and R³ are methyl.

4. A compound in accordance with claim 1 which is 2,6-di-t-butyl-p-benzoquinone imine O-(dimethoxyphosphonyl) oxime.

5. A compound in accordance with claim 1 which is 2,6 - di - t - butyl-p-benzoquinone imine O-(ethylmethoxyphosphonyl) oxime.

6. An insecticidal composition comprising an insecticidal adjuvant and an effective amount of a compound of the formula

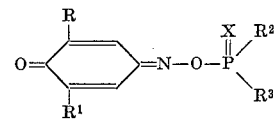

in which X is sulfur or oxygen and R, R¹, R² and R³ are alkyl or alkoxy having from 1 to 5 carbon atoms.

7. An insecticidal composition in accordance with claim 6 in which R and R¹ are tertiary butyl.

8. An insecticidal composition in accordance with claim 6 in which R and R¹ are tertiary butyl and R² and R³ are methyl.

9. An insecticidal composition in accordance with claim 6 in which the compound is 2,6-di-t-butyl-p-benzoquinone imine O-(dimethoxyphosphonyl) oxime.

10. An insecticidal composition in accordance with claim 6 in which the compound is 2,6-di-t-butyl-p-benzoquinone imine O-(ethylmethoxyphosphonyl) oxime.

11. A method of controlling insects which comprises contacting the insect with an insecticidally effective amount of at least one compound of the formula

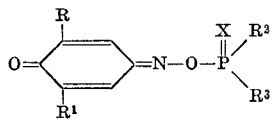

in which X is sulfur or oxygen and R, $R^1$, $R^2$ and $R^3$ are alkyl or alkoxy having from 1 to 5 carbon atoms.

12. A method in accordance with claim 11 in which R and $R^1$ are tertiary butyl.

13. A method in accordance with claim 11 in which R and $R^1$ are tertiary butyl and $R^2$ and $R^3$ are methyl.

14. A method in accordance with claim 11 in which the compound is 2,6-di-t-butyl-p-benzoquinone imine O-(dimethoxyphosphonyl) oxime.

15. A method in accordance with claim 11 in which the compound is 2,6-di-t-butyl-p-benzoquinone imine O-(ethylmethoxyphosphonyl) oxime.

References Cited

UNITED STATES PATENTS

| | | | |
|---|---|---|---|
| 2,907,775 | 10/1959 | Dunbar | 260—396 |
| 3,094,406 | 6/1963 | Price et al. | 424—211 |

LORRAINE A. WEINBERGER, Primary Examiner

V. GARNER, Assistant Examiner

U.S. Cl. X.R.

260—396 N, 624 E